May 24, 1949.  G. R. TREMOLADA  2,470,960
AUTOMATIC WASH PIPE OILER FOR ROTARY SWIVELS
Filed July 20, 1946  3 Sheets-Sheet 1
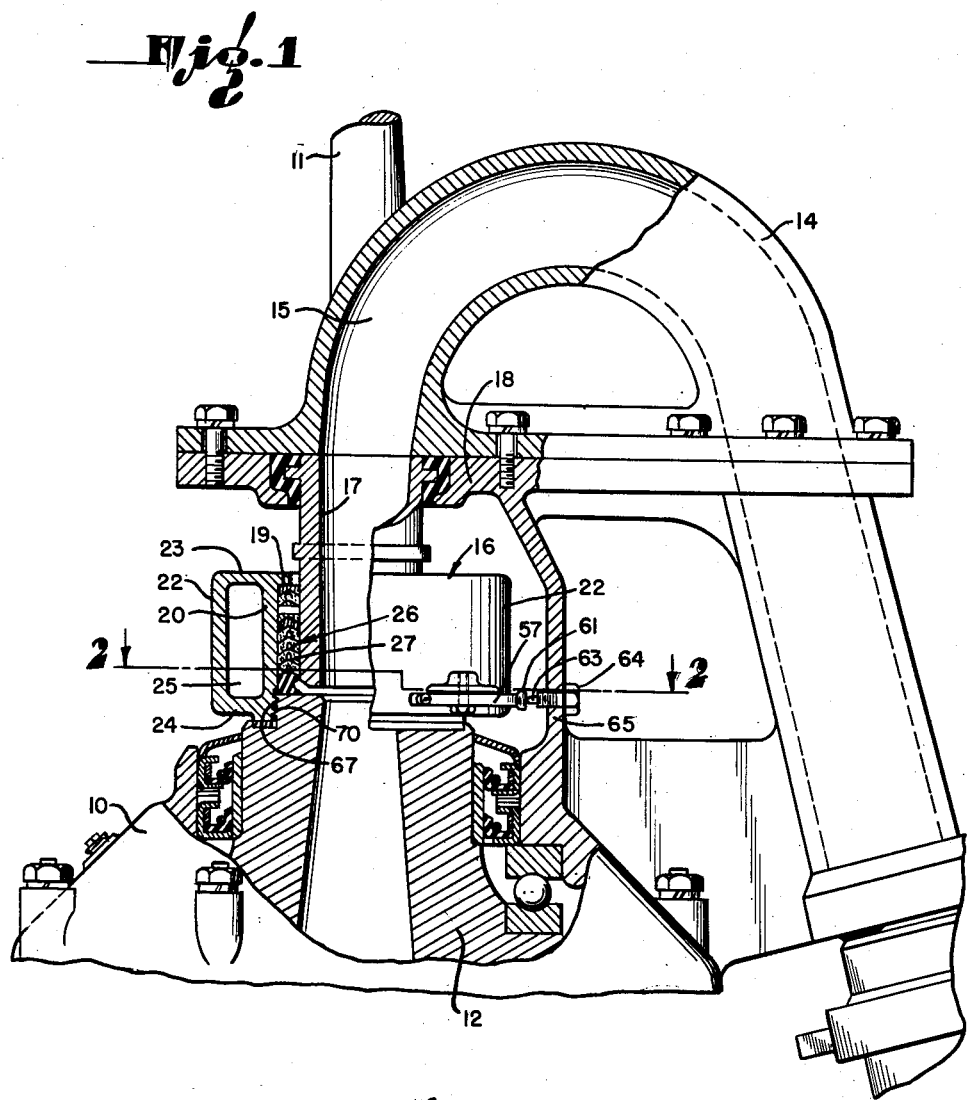
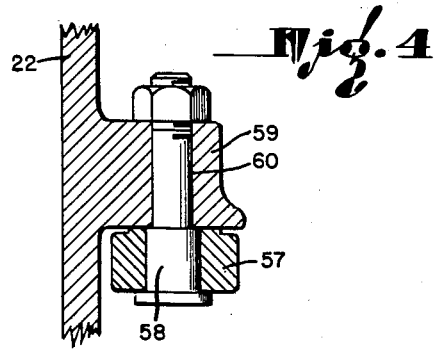
INVENTOR
GUGLIELMO R. TREMOLADA
BY
ATTORNEY May 24, 1949.    G. R. TREMOLADA    2,470,960
AUTOMATIC WASH PIPE OILER FOR ROTARY SWIVELS
Filed July 20, 1946    3 Sheets-Sheet 2
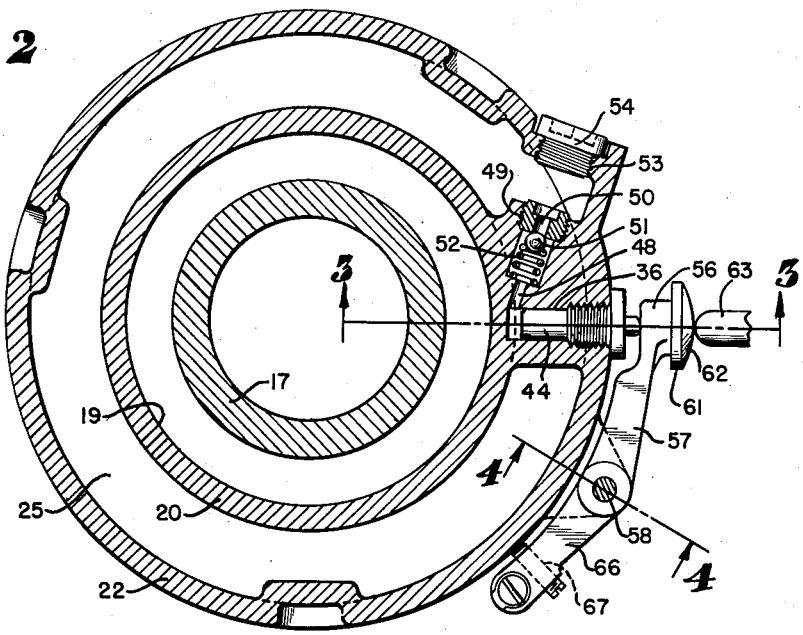
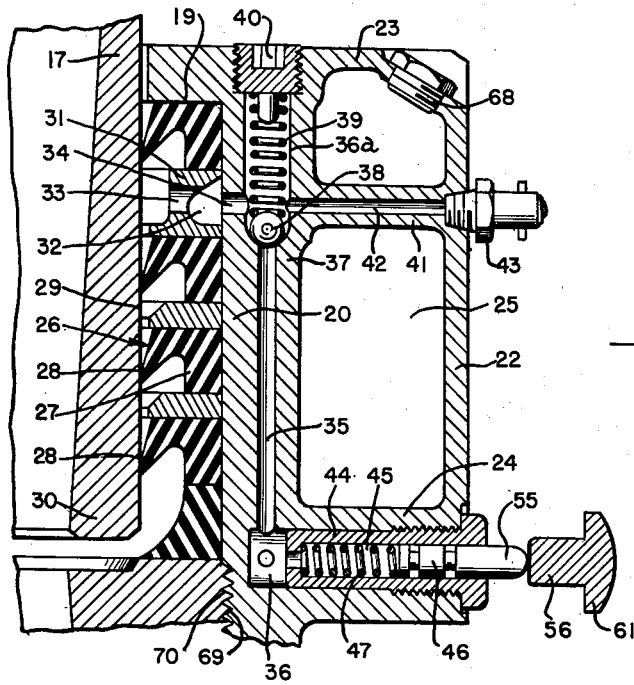
INVENTOR
GUGLIELMO R. TREMOLADA
ATTORNEY

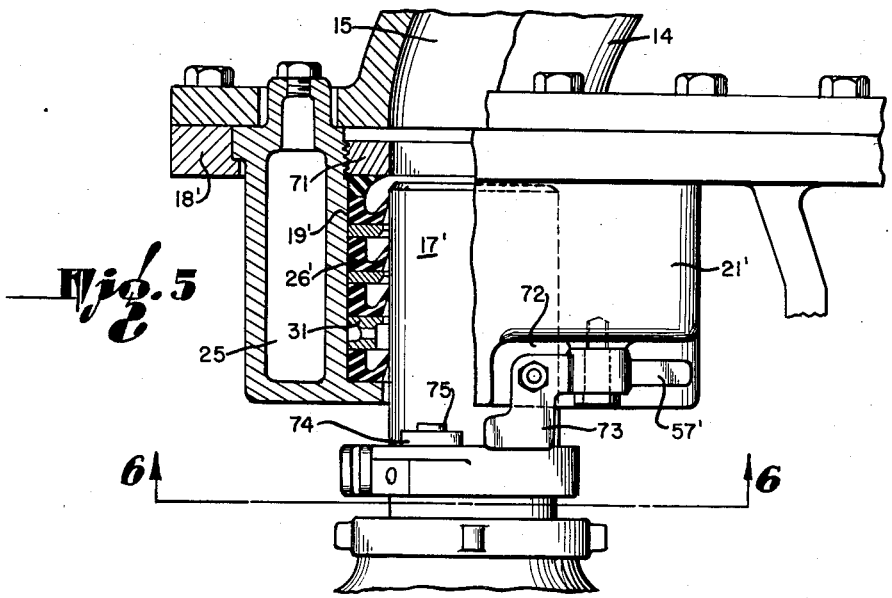
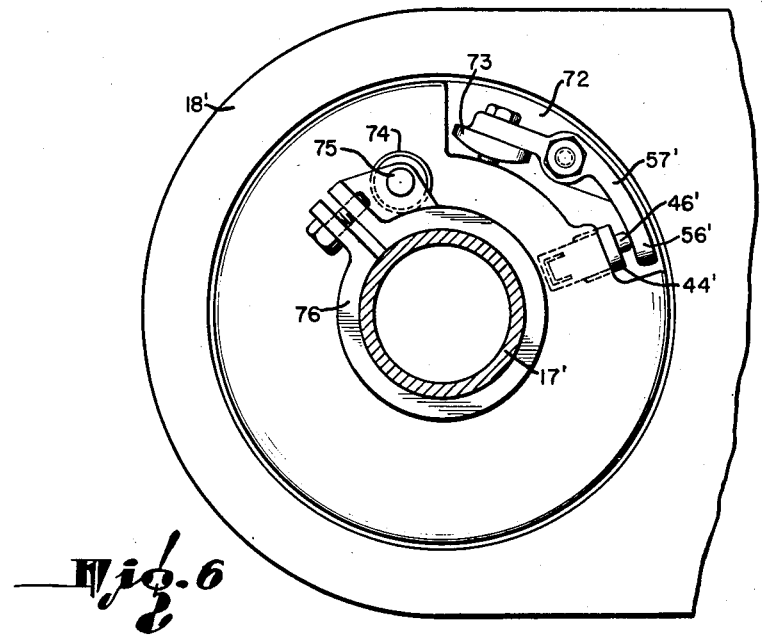

Patented May 24, 1949

2,470,960

UNITED STATES PATENT OFFICE 2,470,960

AUTOMATIC WASH PIPE OILER FOR ROTARY SWIVELS

Guglielmo R. Tremolada, Los Angeles, Calif., assignor to Emsco Derrick & Equipment Company, Los Angeles, Calif., a corporation of California Application July 20, 1946, Serial No. 685,065

9 Claims. (Cl. 285—97.1)

My invention relates to rotary swivels and relates in particular to a lubricating device for the swivel fluid connection of rotary swivels which are used in oil well derricks to support the drilling string during the rotary drilling operations.

The fluid swivel connection of a rotary swivel consists of a tubular member or wash pipe which extends from one of the relatively rotatable parts of the rotary swivel, and a packing device mounted on the other relatively rotatable part of the rotary swivel in a position to receive the projecting portion of the tubular member which in the art is called the wash pipe. The pressure of the drilling mud which is pumped through the rotary swivel to the drilling string is often in the range of two thousand pounds per square inch. The result of this high pressure is that the packing of the fluid swivel connection operates under conditions of severe wear so that frequent replacements of the packing is required. It is an object of the invention to provide a fluid swivel connection which will operate over longer periods of time before replacement of parts becomes necessary, this fluid swivel connection having an automatically operating means for feeding lubricant through the packing chamber in a direction opposite to that in which the pressure of mud is applied against the packing. In this device not only are the wearing surfaces of the fluid swivel, that is to say, the packing and the surface of the wash pipe, amply lubricated, but also the counter flow of lubricant through the packing chamber of the swivel connection prevents entry of abrasive materials from the mud into the packing chamber, and thereby eliminates the wear on the packing and the wash pipe which occur in ordinary swivel connections as the result of the entry of abrasive substances into their packing chambers.

It is an object of the present invention to provide a fluid swivel connection for rotary swivels having a packing chamber surrounding a portion of the wash pipe and means operated in consequence of the rotation of the rotatable sleeve of the rotary swivel to feed a small quantity of oil substantially continuously from a reservoir into the packing chamber at the point spaced from the end of the wash pipe, thereby producing a flow of lubricant through the packing chamber against the pressure of the mud which occupies the mud passages of the rotary swivel.

It is an object of the invention to provide a rotary swivel having a shell or supporting member adapted to be suspended by the hoisting equipment of the derrick, a rotary sleeve carried by bearings in the shell, this rotary sleeve having a packing chamber and an oil reservoir on its upper end positioned so that the packing chamber will receive the lower portion of a downwardly projecting wash pipe and oil pumping means associated with the reservoir for pumping a small quantity of oil under pressure into the packing chamber of the device as the result of rotation of the sleeve and the structure which is secured to its upper end.

A further object of the invention is to provide in a device of the character described herein a simple replaceable pumping unit and means for actuating the same, and a further object of the invention is to provide as a means for operating the pump a lever on one of the rotatable parts arranged to be engaged by a member on the remaining relatively rotatable parts whereby operation of the lever and the pump will be accomplished automatically as the result of the use of the swivel in drilling operations.

Further objects and advantages of the invention will be brought out in the following specification wherein the details and specific description of the invention is for the purpose of fully disclosing the same without placing limitation on the scope of the invention defined in the appended claims.

Referring to the drawings, which are for illustrative purposes only:

Fig. 1 is a fragmentary partly sectioned elevational view showing a preferred form of my invention. wherein the lubricating device is located upon the upper end of the rotatable parts of the rotary swivel.

Fig. 2 is a fragmentary sectional view taken as indicated by the line 2—2 of Fig. 1.

Fig. 3 is a fragmentary sectional view taken as indicated by the line 3—3 of Fig. 2 and showing an alternative form of packing which may be employed in conjunction with the invention.

Fig. 4 is a fragmentary sectional view taken as indicated by the line 4—4 of Fig. 2.

Fig. 5 is a partly sectioned elevational view of an alternative form of the invention.

Fig. 6 is a sectional view taken as indicated by the line 6—6 of Fig. 5.

In the form of the invention shown in Fig. 1, there is a rotary swivel housing or shell 10 adapted to be suspended from the hoisting equipment of a derrick in the customary manner by means of a bail 11. This shell 10 serves as a support for a rotary member 12 which is of tubular form and is rotatable on a vertical axis. In accordance with customary practice, the lower end of this rotary member 12 is connectible to the kelly bar forming the upper extremity of a drilling string, and the rotary member 12 has therein a passage 13 through which drilling mud is conducted to the upper end of the drilling string.

On the upper part of the shell 10 there is a gooseneck member 14 which receives mud under pressure from the mud pumps of the derrick, and for the purpose of connecting the mud passage 15 of the gooseneck 14 to the passage 13 of the rotary member 12, a fluid swivel connection 16 is provided. This fluid swivel connection 16 consists of a wash pipe 17 which extends downward from the supporting wall 18 integrally formed on the upper part of the shell 10.

The wash pipe 17 is in axial alignment with the rotary member 12 and its lower portion projects into a packing chamber 19 formed by the inner annular wall 20 of a member 21 which has an outer cylindric wall 22 and radial walls 23 and 24 cooperating with the wall 20 to form an annular oil reservoir 25 surrounding the packing chamber 19.

As shown in Figs. 1 and 3, the packing chamber 19 has therein packing means 26 which may be either of the chevron type shown in Fig. 1 or of the improved type shown in Fig. 3, each of these types comprising a plurality of packing rings 27 having annular lips 28 which engage the cylindrical surface 29 of the wash pipe 17 and face downwardly toward the lower end 30 of the wash pipe 17 so as to be faced toward the pressure of filling mud in the space 31 at the lower end of the packing chamber 19. Spaced from the lower end 30 of the wash pipe 17, as shown in Fig. 3, the packing means 26 includes a lattern ring 31 having an external channel 32 and radial openings 33 whereby lubricant is conducted from the channel 32 to the space within the packing means adjacent the surface of the wash pipe 17.

As shown in Fig. 3, the wall 20 surrounding the packing chamber 19 is provided with an oil port 34 positioned to communicate with the annular channel 32 of the lattern ring 31. In the radial plane defined by the oil port 34 the wall 20 is thickened and an oil delivery passage 35 is formed vertically therein. The lower end of this oil delivery passage 35 communicates with the inner end of a pump recess 36 formed in the lower wall 24 of the reservoir 25, and the upper end of the passage 35 communicates through the port 34 with the packing chamber 19. The upper end of the passage 35 is provided with a counterbore 36' which extends below the horizontal plane of the port 34 and provides a valve seat 37 against which a valve closure 38 is urged by a compression spring 39 which is retained by a plug 40 threaded into the upper end of the counterbore 36'. Extending across the oil reservoir 25 from the wall 20 to the other wall 22, in alignment with the port 34, there is a web 41 having therein a grease passage 42 with a grease fitting 43 at its outer end whereby lubricant may be fed through the passage 42 and the port 34 into the packing means 26 at any time.

The pump chamber 36 consists of a blind radial bore internally threaded at its outer end to receive an insertable pump cylinder 44, which, as shown in Fig. 3, has an axial cylinder bore 25 in which a plunger or piston 46 operates against a compression spring 47, the function of which is to return the piston 46 to its outermost position when it has been actuated inwardly. As shown in Figs. 2 and 3, a counterbored oil inlet passage 48 is drilled laterally to communicate with the inner end of the pump recess 36. As shown in Fig. 2, a valve seat member 49 is threaded into the outer end of the passage 48, this member 49 having an oil inlet port 50 adapted to be closed by an inlet valve closure 51 which is actuated by a spring 52. A threaded opening 53 is formed in the outer wall 22 in alignment with the inlet passage 48 through which access to the valve member 49 is attained. The opening 53 is closed by a drain plug 54 for the oil reservoir 25.

The outer end 55 of the piston 46 is engaged by the front end 56 of a lever 57 which is supported on the lower portion of the wall 22 by a vertical shaft member 58. As shown in Figs. 1 and 4, a lug 59 is formed on the exterior of the wall 22 and in this lug 59 a vertical opening 60 is drilled to receive the upper portion of the pin 58. The lever 57 is disposed with its inner face relatively close to the surface of the wall 22 and therefore disposed in tangential relation to the axis of rotation of the rotary member 12. On the front end 56 of the leved 57 there is a head 61 having an arcuate outer face 62, thereby providing on the lever 57 an engageable member which will be engaged by the inner ends 63 of a screw 64 which is threaded through the wall 65 formed on the shell 10 as a part of the support for the wash pipe and the gooseneck. In the rear end 66 of the lever 57 there is a screw 67 which provides an adjustable means for limiting the clockwise rotation of the lever 57. This screw 67 serves as a means for regulating the stroke of the piston 46, since it limits the distance the front end 56 of the lever 57 may swing outward after it has been depressed by the member 63.

The operation of the device is as follows: After the assembly of parts and prior to the rotation of the rotary member 12 which occurs during rotary drilling operations, the packing means 26 may be filled with lubricant by forcing grease in through the grease fitting 43, and the reservoir 25 is filled with a light oil through the plugged filling port 68, Fig. 3. Thereafter, when the drilling string is rotated by the rotary machine of the derrick, the rotary member 12 will revolve therewith and the packing and lubricating member 21 which is threaded onto the upper end of the rotary member 12 will likewise revolve therewith and during each revolution thereof the head 61 of the lever 57 will pass the abutment formed by the inner end 63 of the screw 64. The part 63 will engage the curved face 62 of the head 61 and cause the front end 56 of the lever 57 to move a short distance toward the wall 22, thereby moving the pump piston 55 inward through a pumping stroke. This will displace from the inner end of the pump cylinder 46 the oil contained therein and a small quantity of oil will be forced upward through the passage 35 at the port 36 into the packing chamber 19. When the head 61 passes the abutment 63, the spring 45 will urge the piston 46 outward. The outward movement of the piston 46 will be transmitted to the front end 56 of the lever 57, rotating the same in clockwise direction until the screw 67 in the rearward end of the lever 57 is brought into engagement with the wall 22. When the piston 46 is moved outward by the spring 45, oil will be drawn into the pump recess 36 through the valved inlet passage 48 to compensate for the small quantity of oil which has been discharged through the oil delivery passage 35 into the packing means 26 as a result of the preceding actuation of the piston 46.

The packing and lubricating device may be made in the form of an attachment as shown having internal threads 69 whereby the device may be threaded onto the threaded upper end 70 of a standard rotary member 12 of a rotary swivel. The reservoir 25 provided in a device of this size will contain sufficient oil for the operation of the device for a minimum period of twenty-four hours' continuous service. The results obtained from the use of the invention are an appreciable improvement over the art. Failure of the packing of rotary swivels under the high pressures of mud necessary in the drilling of these wells, has been a source of great concern. In many instances it is found necessary to stop drilling operations after a relatively short period of operation in order to replace the swivel packing. This constitutes an element of danger for the reason that it is inadvisable to stop the circulation of mud through the well for any appreciable length of time. Owing to the positive lubrication of the wearing parts of the swivel fluid connection accomplished by my invention, and the prevention of the entry of abrasive substances into the packing, a very long useful life of the packing is accomplished.

In Figs. 5 and 6 I show a form of my invention wherein the parts are reversed as to position, but all of the characteristics described with relation to the form of the invention shown in Figs. 1 to 4 are present. In this alternative form of the invention the wash pipe 17' is mounted on the upper end of the rotary member 12 of the swivel so that the wash pipe 17' rotates therewith in inwardly projecting relation. To receive the wash pipe 17' the packing and lubricating device 21' is supported by a wall 18' which is analogous to the wall 18 of Fig. 1. Instead of rotating with the rotary member 12, the device 21' is stationary or non-rotating and the wash pipe 17' rotates inside the packing means 26' which is held in place in a packing chamber 19' by a threaded ring 71.

The device 21' has an oil pump 44' for forcing oil from the reservoir 25 into the packing means 26' in exactly the same manner as described with relation to Figs. 1 to 4. For actuation of the piston 46 of the pump 44', a lever 57' is provided. This lever 57 is placed in a recess 72 formed in the lower exterior portion of the member 21', and the lever 57' has a wall 73 which projects below the lower face of the member 21' so as to be engageable by a roller 74 supported by a pin 75 on a ring 76 which is clamped on the lower portion of the wash pipe 17' whereby each revolution of the wash pipe 17' will result in the roller 74 engaging the inner face 77 of the wall or lug 73 of the lever 57', causing a clockwise rotation of the lever 57' so that the end 56' thereof will force the piston 46 inward a short distance. Each operation of the pump piston 46' will force a small quantity of oil from the reservoir through the lattern ring 31 of the packing means 26' and therefore there will be a small upward flow of oil through the packing means 26' along the surface of the wash pipe 17' in upward direction or in counter flow relation to the pressure of mud applied to the upper end of the packing means 26'.

I claim:

1. The combination with a rotary swivel of the character described having a shell, a pipe supporting rotatable member carried by said shell, said member having a passage therethrough, means on said shell for supporting a wash pipe above said rotatable member in axial alignment therewith; of a wash pipe sealing device on the upper end of said rotatable member having walls defining a packing opening to receive the lower portion of said wash pipe and rotating with said member; a packing means in said opening comprising a plurality of annular lips facing toward the open end of said wash pipe and engaging the same; walls forming an annular oil reservoir surrounding said opening, a pump-receiving recess having a valved oil inlet passage communicating with said reservoir and a valved discharge passage communicating with said packing opening so as to deliver oil into said packing means at a point spaced from the end of said wash pipe; a pump unit insertable in said recess, comprising a pump cylinder and a pump piston member operative in said cylinder; a lever pivoted on said device for reciprocating said piston member, said lever having an external engageable face; and means on said shell to engage said engageable face and actuate said lever when said device rotates as the result of rotation of said rotatable member.

2. The combination with a rotary swivel of the character described having a shell, a pipe supporting rotatable member carried by said shell, said member having a passage therethrough, means on said shell for supporting a wash pipe above said rotatable member in axial alignment therewith; of a wash pipe sealing device on the upper end of said rotatable member having walls defining a packing opening to receive the lower portion of said wash pipe and rotating with said member; a packing means in said opening engaging the external face of said wash pipe; walls forming an oil reservoir contiguous to said opening, a pump-receiving recess having a valved oil inlet passage communicating with said reservoir and a valved discharge passage communicating with said reservoir and a valved discharge passage communicating with said packing opening so as to deliver oil into said packing means at a point spaced from the end of said wash pipe; a pump unit insertable in said recess, comprising a pump cylinder and a pump piston member operative in said cylinder; and means comprising a part on said shell engageable so as to depress said piston member when said device rotates as the result of rotation of said rotatable member.

3. The combination with a rotary swivel of the character described having a shell, a pipe supporting rotatable member carried by said shell, said member having a passage therethrough, means on said shell for supporting a wash pipe above said rotatable member in axial alignment therewith; of a wash pipe sealing device on the upper end of said rotatable member having walls defining a packing opening to receive the lower portion of said wash pipe and rotating with said member; packing means in said opening comprising a plurality of annular lips facing toward the open end of said wash pipe and engaging the same; walls forming an annular oil reservoir surrounding said opening; pumping means having a piston; walls forming a valved oil inlet passage for said pump means and a valved discharge passage for carrying oil from said pump means to a point in said packing means spaced from the end of said wash pipe; a lever pivoted on said device for reciprocating said piston member, said lever having an external engageable face; and means on said shell to engage said engageable face and actuate said lever when said device rotates as the result of rotation of said rotatable member.

4. The combination with a rotary swivel of the character described having a shell, a pipe supporting rotatable member carried by said shell, said member having a passage therethrough, means on said shell for supporting a wash pipe above said rotatable member in axial alignment therewith; of a wash pipe sealing device on the upper end of said rotatable member having walls defining a packing opening to receive the lower portion of said wash pipe and rotating with said member; a packing means in said opening engaging the external face of said wash pipe; walls forming an oil reservoir contiguous to said opening; pumping means having a piston; walls forming a valved oil inlet passage for said pump means and a valved discharge passage for carrying oil from said pump means to a point in said packing means spaced from the end of said wash pipe; and means comprising a rotary part on said shell engageable so as to depress said piston member when said device rotates as the result of rotation of said rotatable member.

5. In lubricating means for the swivel connection of a swivel of the character described having a rotary part for connection to a string of pipe and a non-rotating part for connection to the hoisting equipment of a derrick, a wash pipe connected to one of said parts and a packing device connected to the other of said parts in a position to receive said wash pipe, the combination of: walls forming an oil reservoir on said part which carries said packing device, and an oil delivery passage communicating with the interior of said packing device; a pump associated with said reservoir having a pumping element and an exposed actuating means for said pumping element, said pump having its inlet connected to the interior of said reservoir and its outlet connected to said oil delivery passage; and means on said part which carries said wash pipe for engaging said actuating means and operating the same as said rotary part revolves with relation to said non-rotating part whereby said pumping element will be actuated so as to feed oil under pressure into said packing device.

6. In a lubricating means for the swivel connection of a swivel of the character described having a rotary part for connection to a string of pipe and a non-rotating part for connection to the hoisting equipment of a derrick, a wash pipe connected to one of said parts and a packing device connected to the other of said parts in a position to receive said wash pipe, the combination of: walls forming an oil reservoir on said part which carries said packing device, and an oil delivery passage communicating with the interior of said packing device; a pump associated with said reservoir having a pumping element and an exposed actuating means for said pumping element, said pump having its inlet connected to the interior of said reservoir and its outlet connected to said oil delivery passage; means on said part which carries said wash pipe for engaging said actuating means and operating the same as said rotary part revolves with relation to said non-rotating part whereby said pumping element will be actuated so as to feed oil under pressure into said packing device; and adjusting means for controlling the actuation of said pumping element whereby regulation of the quantity of oil fed by said pump to said packing device may be effected.

7. In lubricating means for the swivel connection of a swivel of the character described having a rotary part for connection to a string of pipe and a non-rotating part for connection to the hoisting equipment of a derrick, a wash pipe connected to one of said parts and a packing device connected to the other of said parts in a position to receive said wash pipe, the combination of: walls forming an oil reservoir on one of said parts; a pump associated with said reservoir, said pump having a valved oil inlet communicating with said reservoir, means forming a valved oil delivery passage connecting the outlet of said pump with the interior of said packing device; and means carried by the other of said parts to effect operation of said pump as a result of relative rotation of said parts during the use of the swivel.

8. In lubricating means for the swivel connection of a swivel of the character described having a rotary part for connection to a string of pipe and a non-rotating part for connection to the hoisting equipment of a derrick, a wash pipe connected to one of said parts and a packing device connected to the other of said parts in a position to receive said wash pipe, the combination of: walls forming an oil reservoir on one of said parts; a pump associated with said reservoir, said pump having a valved oil inlet communicating with said reservoir, means forming a valved oil delivery passage connecting the outlet of said pump with the interior of said packing device; means carried by the other of said parts to effect operation of said pump as a result of relative rotation of said parts during the use of the swivel; and adjusting means for controlling the actuation of said pumping element whereby regulation of the quantity of oil fed by said pump to said packing device may be effected.

9. In lubricating means for the swivel connection of a swivel of the character described having a rotary part for connection to a string of pipe and a non-rotating part for connection to the hoisting equipment of a derrick, a wash pipe connected to said rotary part and a packing device connected to said non-rotating part in a position to receive said wash pipe, the combination of: walls forming an oil reservoir on said non-rotating part, and an oil delivery passage communicating with the interior of said packing device; a pump associated with said reservoir having a pumping element and an exposed actuating means for said pumping element, said pump having its inlet connected to the interior of said reservoir and its outlet connected to said oil delivery passage; and means on said rotary part for engaging said actuating means and operating the same as said rotary part revolves with relation to said non-rotating part whereby said pumping element will be actuated so as to feed oil under pressure into said packing device.

GUGLIELMO R. TREMOLADA.

REFERENCES CITED

The following references are of record in the file of this patent:

UNITED STATES PATENTS

| Number | Name | Date |
| --- | --- | --- |
| 2,150,529 | Tremolada | Mar. 14, 1939 |
| 2,394,800 | Murphy | Feb. 12, 1946 |